United States Patent [19]

Genrich

[11] Patent Number: 5,706,217
[45] Date of Patent: Jan. 6, 1998

[54] DIGITAL SIGNAL PROCESSING AUTOMATIC GAIN CONTROL AMPLIFIER

[75] Inventor: Thad Genrich, Aurora, Colo.

[73] Assignee: Hughes Aircraft, Los Angeles, Calif.

[21] Appl. No.: 688,465

[22] Filed: Jul. 30, 1996

[51] Int. Cl.[6] .................... G06F 7/00; G05B 13/02
[52] U.S. Cl. .................... 364/715.011; 364/157
[58] Field of Search ..................... 364/715.01, 157; 375/345

[56] References Cited

U.S. PATENT DOCUMENTS 5,465,205  11/1995  Kamiya ........................... 364/157

Primary Examiner—Tan V. Mai
Attorney, Agent, or Firm—G. S. Grunebach; M. W. Sales; W. K. Denson-Low

[57] ABSTRACT

The automatic gain control loop has an automatic gain control loop filter generating a multi-bit gain control word in response to the power level of the output signal of the loop. A shifter circuit shifts the input data by selected number of bits under the control of selected most significant bits of the gain control word multiplying the power of the input signal. A multiplier circuit multiplies the shifted data output from the shifter circuit by predetermined multiplication factors under the control of the remaining bits of the gain control word. The shifting and adding of the input data under the control of the gain control word maintains the power level of the output signal within a predetermined range.

26 Claims, 3 Drawing Sheets

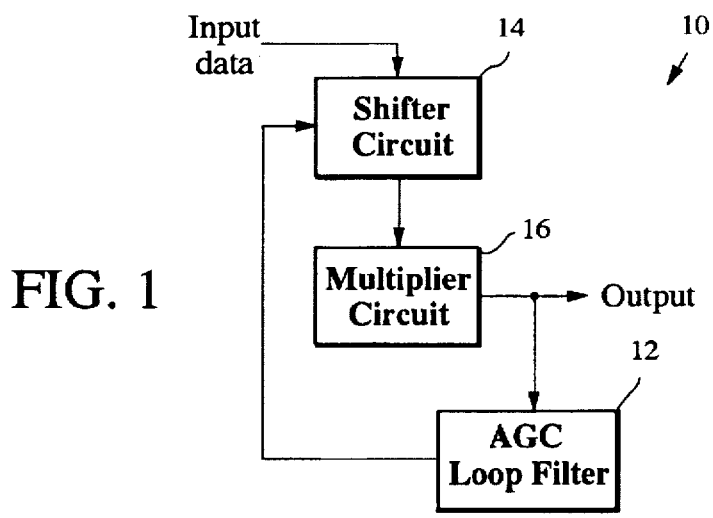
FIG. 1
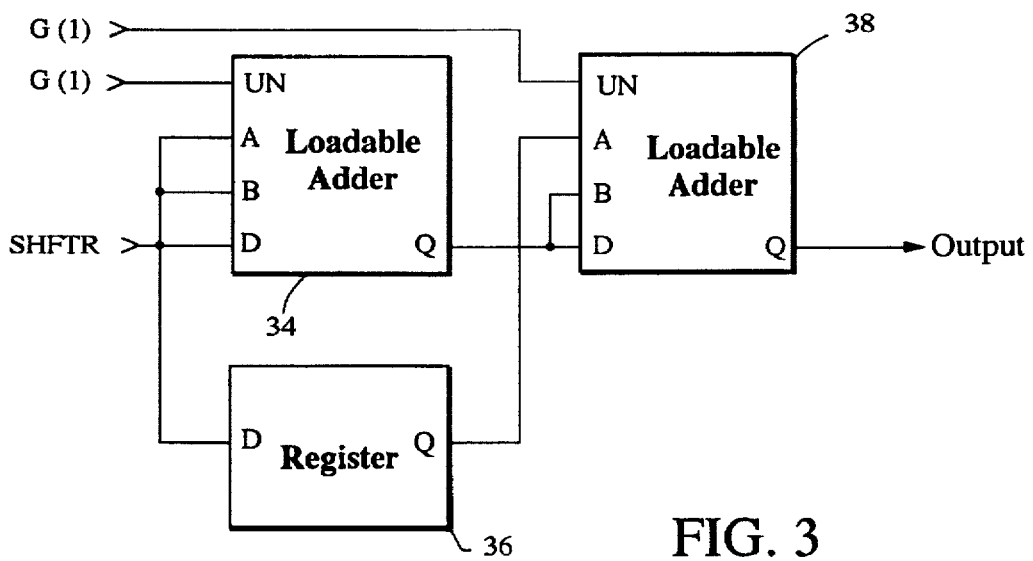
FIG. 3
FIG. 6
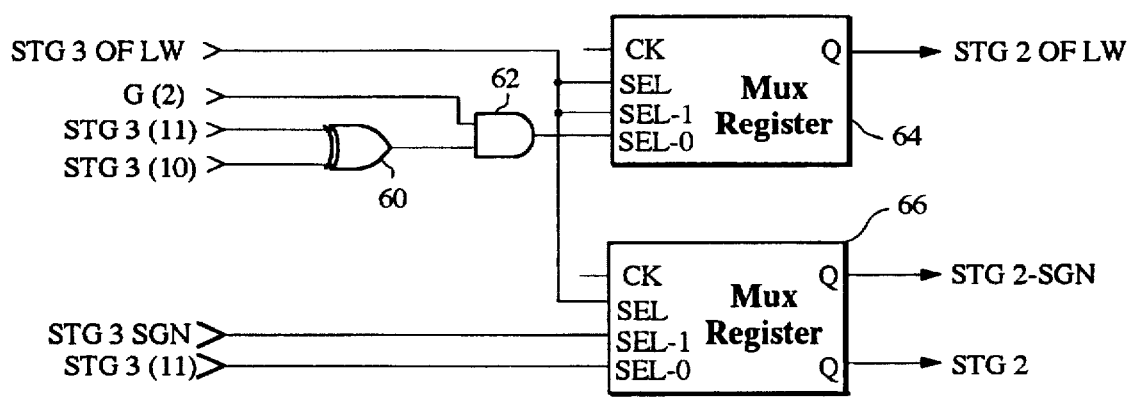

DIGITAL SIGNAL PROCESSING AUTOMATIC GAIN CONTROL AMPLIFIER

TECHNICAL FIELD

The invention is related to digital signal processing and in particular to an automatic gain control amplifier.

BACKGROUND ART

Common hardware implementations of automatic gain controls uses a multiplier as the gain control element. In these automatic gain controls the gain is linear in amplitude therefore a single integrator automatic gain control loop using a multiplier will exhibit response characteristics dependent on the amplitude of the input signal.

Another possible implementation of an automatic gain control could use a programmable shifter as a gain control element. This approach minimizes logic requirements and has an exponential control response. The disadvantage of this approach is that the minimum step size is 6 decibels (dB) which is unacceptable for many applications.

To overcome these problems, the invention is an automatic gain control loop amplifier incorporated in a single integrator and an exponential gain controlled amplifier which exhibits transfer characteristics which are independent of the input signal level.

DISCLOSURE OF THE INVENTION

A digital gain control loop having a gain control filter responsive to the output data of the gain control loop to generate a gain control word determined to maintain the power level of the output data within a predetermined range. A shifter circuit responsive to selected bits of the gain control word shift the input data in accordance with the selected bits of the gain control word. The shifting of the data corresponds to a first multiplication of the input data. A multiplier circuit responsive to the remaining bits of the gain control word multiplies the shifted data output from the shifter circuit by preselected factors to generate the data output of the gain control loop. The shifted data being multiplied by preselected factors controlled by the remaining bits of the gain control word.

A first object of the invention is to provide an exponential gain control loop amplifier having linear decibel characteristics.

Another object of the invention is a gain control loop amplifier in which the response of the loop is independent of the input signal level.

Still another object of the invention is a gain control loop amplifier in which the shifting and adding operations provide a gain control range of 47 decibels.

Yet another object of the invention is an automatic gain control loop amplifier in which the actual gain curve verses gain control word is within +0.21/−0.34 dB of the least mean square error straight line and has a resolution of approximately 1.5 dB per the least significant bit of the gain control word.

Still another object of the invention is an automatic gain control loop amplifier which is easily implemented with shifts and adds.

These and other objects of the invention will become more apparent from reading the specification in conjunction with the drawings.

BRIEF DESCRIPTION OF THE DRAWINGS

FIG. 1 is a block diagram of the automatic gain control loop;

FIG. 3 is an electrical schematic of the multiplier circuit;

FIG. 6 is an electrical schematic of overflow logic circuit 28.

BEST MODE FOR CARRYING OUT THE INVENTION

Figure 2:
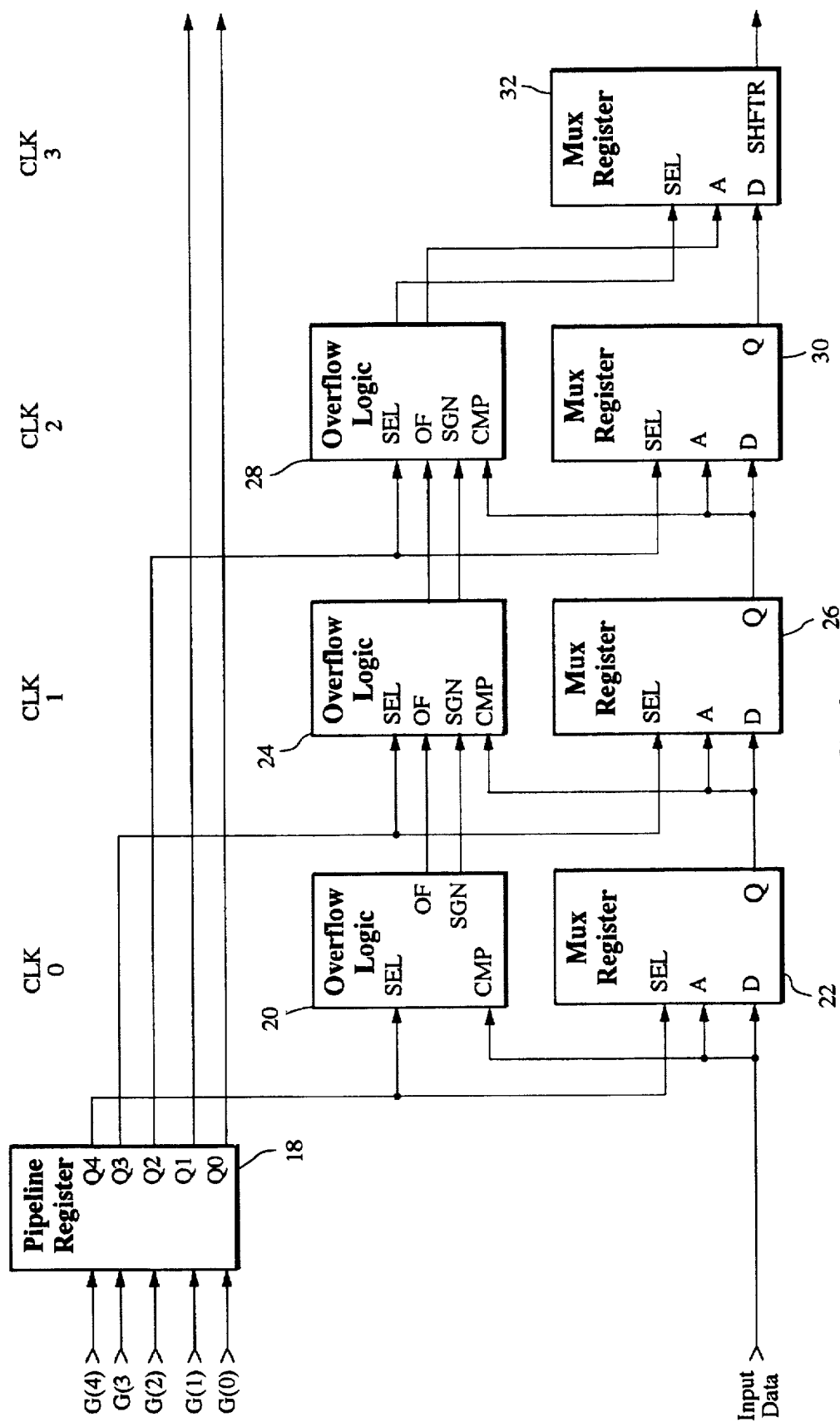
FIG. 2 is an electrical schematic of the shifter circuit.

The basic components of the digital signal processing automatic gain control loop 10 are shown on FIG. 1. The automatic gain control loop has an automatic gain control filter 12 which includes an output level detector responsive to the power level of the output signal of the gain control loop. The gain control filter 12 generates a five bit gain control word operative to maintain the output within a predetermined range. The gain control loop further has a programmable shifter circuit 14 that uses the three most significant bits (MSBs) of a gain control word to select left shifts ranging from 0 to 7 bits representing gains from 1 to 128 to be applied to the input signal sample. This is accomplished with three levels of 12 bit pipelined shifters implemented with 2:1 multiplexer registers. A first level of the shifter circuit 14 uses the most significant bit of the gain control word to select a left shift of 0 or 4 bits corresponding to gains of 1 or 16. The second level uses the second most significant bit of the gain control word to select a left shift of 0 or 2 bits corresponding to gains of 1 or 4 respectively. The third level uses the third most significant bit of the gain control word to select a left shift of 0 to 1 corresponding to gains of 1 or 2 respectively.

Overflow is detected at each level with overflow detection logic circuits which detect an overflow when a shift at any of the three levels is selected. If overflow occurs, an overflow signal (OFLW) is pipelined to the next shift level. A sign (SGN) signal prepended to the input data is preserved and pipelined through the shift circuit 14. A fourth shifter level is used to select positive or negative full scale values for the output whenever overflow occurs and allows the shifted output through when there is no overflow. The least significant bit (LSB) of the shifted output is truncated to prevent overflow in the programmable multiplier circuit 16. This is equivalent to dividing the shifted output by 2.

A programmable multiplier circuit 16 uses the two least significant bits (LSBs) of the gain control word to select multiplication factors such as 4, 5, 6 or 7. This is accomplished by two levels of pipelined loadable adders. The first level of the multiplier circuit 16 uses the penultimate bit of the gain control word, i.e. the bit preceding the least significant bit to multiply the output from the shifter circuit 14 by 4 or by 6. The second level uses the least significant bit to pass the output from the first level unchanged or add the original input signal to the output from the first level. Although, in the illustrated embodiment, the shifter circuit 14 is responsive to the most significant bits of the gain control word and the multiplier circuit is responsive to selected least significant bits, it is recognized this arrangement may be reversed and the shifter circuit 14 may be responsive to the least significant bits and the multiplier circuit 16 may be responsive to selected most significant bits of the gain control word.

The combined shifting and adding operations provide a gain control range of 4/32 (−18.06 dB) to 28 (+28.94 dB) or totaled 47 dB.

The details of the shifter circuit 14 are shown on FIG. 2. To simplify the drawing, required clock and reset connections are not shown. In this embodiment the gain control word consists of 5 bits, G(4) through G(0) with bit G(4) being the most significant bit and G(0) being the least significant bit. The 5 gain control bits are received by a pipeline register 18. The most significant bit of the gain control word is applied to a first overflow logic circuit 20 and to the select (SEL) input to a first multiplexer register 22.

The input data consists of 10 bits indicated as INP(9) through INP(0) where INP(9) is the most significant bit and INP(0) is the least significant bit. The input data is applied directly to the D input of a first multiplexer register 22 and the input data, shifted 4 bits to the left, is applied to an alternative input A. The input data shifted to the right is applied to the compare (CMPR) input of the first overflow logic circuit 20 so that only the 5 most significant bits are input to the first overflow logic circuit 20.

The first multiplexer register 22 will respond to the value of the most significant bit of the gain control word G(4) and output, at its output Q, the input data applied to input D in response to the most significant word being 0 or the input data shifted 4 bits to the left (multiplied by 16) applied to the alternate input A in response to the most significant bit of the gain control word, GAIN(4) being a high or logical 1. The first overflow logic circuit, shown on FIG. 4, will generate an overflow signal, STG4-OFLW, at its output in response to the bit G(4) being high and a detected overflow. The first overflow logic circuit will also generate a sign signal STG4-SGN indicative of the sign of the input data.

The second most significant bit of the gain control word G(3) delayed by one clock cycle by the pipeline register 18 is applied to the select input of a second overflow logic circuit 24 and to the select input to a second multiplexer register 26. The overflow and sign signals outputs of the first overflow logic circuit 20 are communicated respectively to the overflow OF and sign SGN inputs of the second overflow logic circuit 24. The three most significant bits from Q output of the first multiplexer register 22 are applied to the compare input to the second overflow logic circuit 24.

The Q output of the first multiplexer register 22 is applied directly to the data input, D, of the second multiplexer register 26 and the Q output shifted 2 bits to the left is applied to the alternate A input to the second multiplexer register 26. The second multiplexer register 26 will output at its output the data applied to its D input in response to the second most significant bit of the gain control word being low or output the data applied to its A input in response to the second most significant bit of the gain control word being high.

The third most significant bit of the gain control word G(2) delayed by two clock cycles by the pipeline register 18 is communicated to the select input to a third overflow logic circuit 28 and to the select input of a third multiplexer register 30. The overflow signal, STG3-OFLG, and sign signal, STG3-SGN, inputs from the second overflow logic circuit 24 are applied directly to the OF and SGN inputs to the third overflow logic circuit 28. The Q output of the second multiplexer register 26 is applied directly to the data D input of the third multiplexer register 30 to the A input shifted one place to the left (multiplied by 2) and to the most significant bit of the Q output of the second multiplexer register 26 is applied to the compare input of the third overflow logic circuit 28. The third multiplexer register will output at its Q output the data applied to its D input in response to the second most significant bit of the gain control word being low and output the data applied to its alternate A input in response to the third most significant bit being high.

The overflow signal, STG2-OFLW, and the sign signal, STG2-SGN, from the third overflow logic circuit 28 are applied to select and A inputs of the fourth multiplexer register 32 and the Q output of the third multiplexer register 30 is applied directly to the data D input of the fourth multiplexer register 32. As indicated previously, if an overflow condition is detected by any of the overflow logic circuits 20, 24 or 28, the overflow signal will cause the fourth multiplexer register 32 to output at its Q output full scale values. The sign of the full scale values is determined by the sign signal, STG2-SGN, output from the SGN output of the third overflow logic circuit 28. If an overflow is not detected, the fourth multiplexer register 32 will output at its Q output the shifted output from the third multiplexer register 30.

In the disclosed embodiment, the original input data is multiplied in the first multiplexer register 22, by either one or sixteen based on the value of the most significant bit of the gain control word. In a like manner, the data output from the first multiplexer register 22 is multiplied by either one or four in the second multiplexer register 26 based on the value of the second most significant bit. Similarly, the output from the second multiplexer register 26 is multiplied by either one or two in the third multiplexer register 30 based on the value of the third most significant bit of the gain control word. The gain of the shifter circuit therefore can range from x1 to x128.

Although the multiplexer registers 22, 24 and 28 in the embodiment illustrated and described herein are multiplexer registers, it is obvious to one skilled in the art that multiplexers could be used in place of these multiplexer registers.

The details of the multiplier circuit 16 are shown on FIG. 3. To simplify the circuit, the required clock and reset connections are not shown. A first loadable adder 34 receives the penultimate bit of the gain control word, G(1), delayed by four clock cycles at the "load not," (LN), input and the shifted (SHFTD) output of the fourth multiplexer register 32 shown in FIG. 2. The shifted output data is applied to input A shifted 1 bit to the left (multiplied by 2) and is applied to the B and D inputs shifted 2 bits to the left (multiplied by 4). The loadable adder 34 will output either the input received at input D in response to penultimate bit, of the gain control word bit G(1) being 0 or output the sum of the inputs applied to inputs A and B when G(1) is high. The output from the fourth multiplexer register 32 is also stored as is in register 36.

The second loadable adder 38 receives the least significant bit of the gain control word G(0) delayed by five clock cycles at its LN input, receives the output of the first loader adder 34 at inputs B and D and receives the Q output of register 36 at input A. The output of the second loadable adder 38 will be the output of the first loadable adder 34 when the least significant bit is 0 or will be the sum of the inputs to input A and B when the least significant bit is high. The output of the first loadable adder 34 may be either the shifted data times 4 or 6 and the output of the second loadable adder 38 may be the shifted data multiplied by 4, 5, 6 or 7 depending on the value of the penultimate and the least significant bit of the gain control word.

The multiplier section shown in FIG. 3 is not limited to the specific multiplication values in the example illustrated in FIG. 3 and described above. It is recognized that multiplication values other than 4, 5, 6 and 7 may be used to improve the resolution of the gain control loop amplifier. Preferentially, these other multiplications are relatively easy to implement with shifts and adds.

Figure 4:
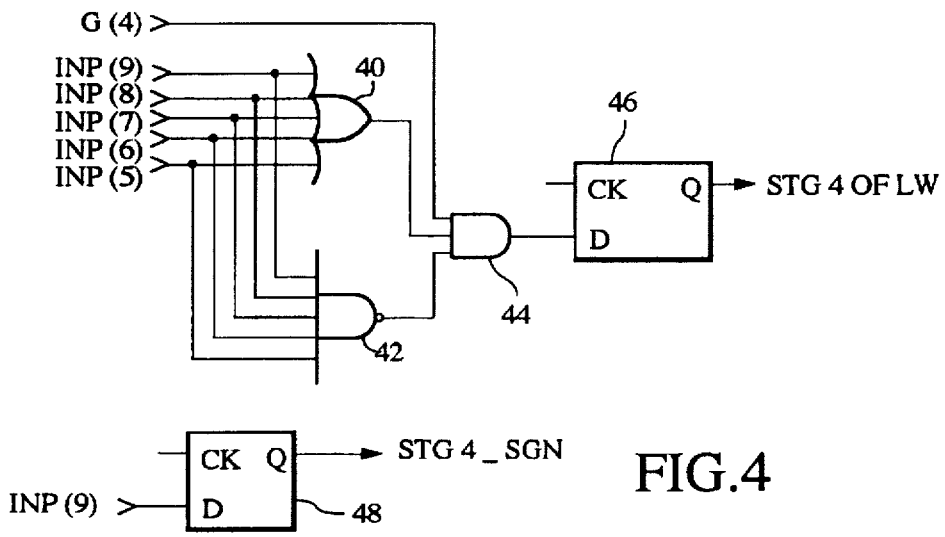
FIG. 4 is an electrical schematic of overflow logic circuit 20.

The details of the first overflow logic circuit 20 are shown on FIG. 4. Again, clock and reset signals are not shown for simplification. The five most significant bits INP(5) through INP(9) of the input signal are applied to inputs to OR gate 40 which outputs 0 if all the inputs are low. The five most significant bits are also applied to the inputs to NAND gate 42 whose output is low if all the inputs are high. The outputs of OR gate 40, of NAND gate 42 and the most significant bit of the gain control word G(4) are received at the inputs to AND gate 44. Overflow can only occur when the most significant bit of the gain control word is high and the output of OR gate 40 and the output of NAND gate 42 are high. The output of OR gate 40 is high if at least one of the five most significant bits of the input differs from the other bits and the output of NAND gate 42 is also high if at least one of the five most significant input bits is different from the other bits. The output of AND gate 44 is received at the D input of flip flop 46. The Q output of the flip flop 46 is high if an overflow is detected and low if an overflow is not detected. The Q output of flip flop 46 is the overflow output STG4-OFLW. Flip flop 48 receives the most significant bit of the input data and the Q output signifies the sign of the input data.

Figure 5:
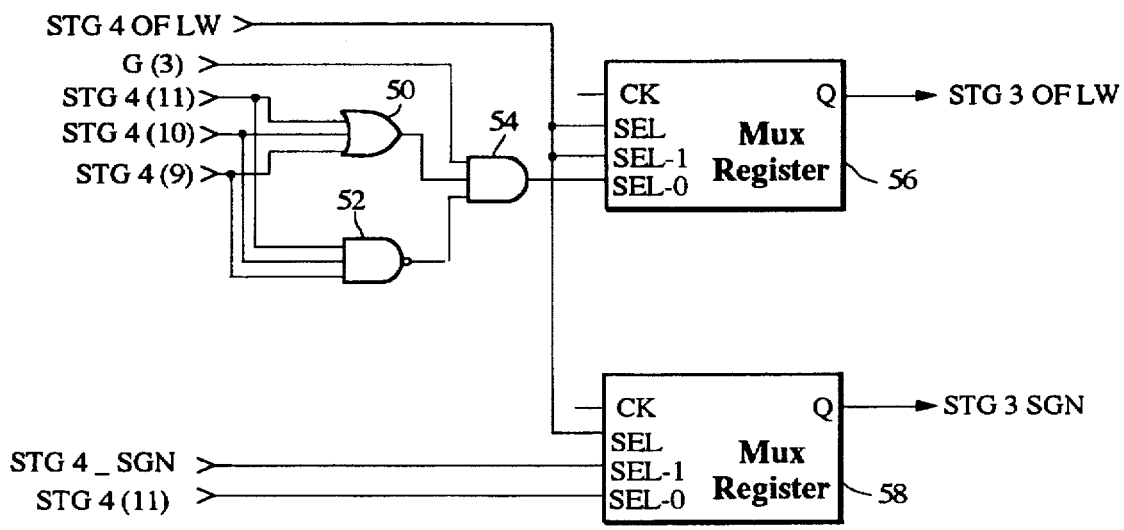
FIG. 5 is an electrical schematic of overflow logic circuit 24.

FIG. 5 shows the details of the second logic circuit 24 shown on FIG. 2. For clarity, the clock and reset signals are omitted. OR gate 50 receives at its inputs the three most significant bits, STG4(11) through STG4(9), output from the first multiplexer register 22. NAND gate 52 also receives the three most significant bits, STG4(11) through STG4(9), output from the first multiplexer register 22. The output of OR gate 50, NAND gate 52 and the second most significant bit G(3) of the gain control word delayed by one clock cycle are received at the inputs to AND gate 54 which produces a high output only when bit G(3) of the gain control word and the output of both OR gate 50 or NAND gate 52 are high.

A multiplexer register 56 receives the overflow signal from the first overflow logic circuit 20 at its select and select 1 inputs and the output of AND gate 54 at its select 0 input. If the first overflow logic circuit 20 detects an overflow, multiplexer register 56 selects the overflow signal generated by the first overflow logic circuit 20 as its output signal. Otherwise, the output of multiplexer register 56 will be high only if an overflow is detected by the second overflow logic circuit 24.

A second multiplexer register 58 receives the overflow output signal, STG4-OFLW, from the first overflow logic circuit 20 at its select input, the sign signal, STG4-SGN, from register 48 at its SEL-1 input and the most significant bit, STG4(11), of the shifted data at its SEL(0) input. If an overflow signal was generated by the first overflow logic circuit 20, multiplexer register 58 will pass the sign signal generated by the first overflow logic circuit. Otherwise, the sign of the most significant bit of the data output from the first multiplexer register 22 will determine the value of the sign signal, STG3-SGN, i.e. 0 if the sign of the most significant bit, STG4(11), is low or 1 if the sign of the most significant bit is high.

The details of the third overflow logic circuit 28 are shown on FIG. 6. Again, the clock and reset signals are omitted to simplify the drawing. The two most significant bits, STG3(11) and STG3(10), of the output of the second multiplexer register 26 are received at the inputs to exclusive OR gate 60. The third most significant bit of the gain control word G2 delayed by two clock cycles and the output of exclusive OR gate (60) are received at AND gate 62. A multiplexer register 64 receives the overflow signal, STG3-OFLW, from the second overflow logic circuit 24 at its SEL and SEL-1 inputs and receives the output of AND gate 62 at its SEL-0 input. Multiplexer register 64 will output at its Q output an overflow signal generated by the second overflow logic circuit 24 as STG2-OFLW if it is high or output the output of AND gate 62 as its overflow signal when the overflow signal STG3-OFLW is low.

Multiplexer register 66 will output sign signal generated by the second overflow logic circuit 24 as STG2-SGN when the overflow signal STG3-OFLW is high or output the sign of the most significant bit, STG3(11), of the output of the second multiplexer register 24. The performance of the automatic gain control amplifier is presented in the following table:

| | | | | 5 BIT LOG LINEAR AGC AMPLIFIER | | | |
|---|---|---|---|---|---|---|---|
| MS CODE | LS CODE | MS GAIN | LS GAIN | OVERALL GAIN | 20 LOG (10) GAIN | BEST FIT ST. LINE | PEAK ERROR N. STRAIGHT LINE |
| 0 | 0 | 1 | 4/32 | 0.1250 | −18.06 | −17.76 | −0.30 |
| 0 | 1 | 1 | 5/32 | 0.1563 | −16.12 | −16.26 | 0.13 |
| 0 | 2 | 1 | 6/32 | 0.1875 | −14.54 | −14.75 | 0.21 |
| 0 | 3 | 1 | 7/32 | 0.2188 | −13.20 | −13.24 | 0.04 |
| 1 | 0 | 2 | 4/32 | 0.2500 | −12.04 | −11.74 | −0.30 |
| 1 | 1 | 2 | 5/32 | 0.3125 | −10.10 | −10.23 | 0.13 |
| 1 | 2 | 2 | 6/32 | 0.3750 | −8.52 | −8.72 | 0.20 |
| 1 | 3 | 2 | 7/32 | 0.4375 | −7.18 | 7.22 | 0.04 |
| 2 | 0 | 4 | 4/32 | 0.500 | −6.02 | −5.71 | −0.31 |
| 2 | 1 | 4 | 5/32 | 0.625 | −4.08 | −4.20 | 0.12 |
| 2 | 2 | 4 | 6/32 | 0.750 | −2.50 | −2.70 | 0.20 |
| 2 | 3 | 4 | 7/32 | 0.875 | −1.16 | −1.19 | 0.03 |
| 3 | 0 | 8 | 4/32 | 1.00 | 0.00 | 0.32 | −0.32 |
| 3 | 1 | 8 | s/32 | 1.25 | 1.94 | 1.82 | 0.11 |
| 3 | 2 | 8 | 6/32 | 1.50 | 3.52 | 3.33 | 0.19 |
| 3 | 3 | 8 | 7/32 | 1.75 | 4.86 | 4.84 | 0.02 |
| 4 | 0 | 16 | 4/32 | 2.0 | 6.02 | 6.34 | −0.32 |
| 4 | 1 | 16 | 5/32 | 2.5 | 7.96 | 7.85 | 0.11 |
| 4 | 2 | 16 | 6/32 | 3.0 | 9.54 | 9.36 | 0.19 |
| 4 | 3 | 16 | 7/32 | 3.5 | 10.86 | 10.86 | 0.02 |
| 5 | 0 | 32 | 4/32 | 4 | 12.04 | 12.37 | −0.33 |

5 BIT LOG LINEAR AGC AMPLIFIER

| MS CODE | LS CODE | MS GAIN | LS GAIN | OVERALL GAIN | 20 LOG (10) GAIN | BEST FIT ST. LINE | PEAK ERROR N. STRAIGHT LINE |
|---|---|---|---|---|---|---|---|
| 5 | 1 | 32 | 5/32 | 5 | 13.98 | 13.88 | 0.10 |
| 5 | 2 | 32 | 6/3 | 6 | 15.56 | 15.38 | 0.18 |
| 5 | 3 | 32 | 7/32 | 7 | 16.90 | 16.89 | 0.01 |
| 6 | 0 | 64 | 4/32 | 8 | 18.06 | 16.40 | −0.34 |
| 6 | 1 | 64 | 5/32 | 10 | 20.00 | 19.90 | 0.10 |
| 6 | 2 | 64 | 6/32 | 12 | 21.58 | 21.41 | 0.17 |
| 6 | 3 | 64 | 7/32 | 14 | 22.92 | 22.92 | 0.00 |
| 7 | 0 | 128 | 4/32 | 16 | 24.08 | 24.43 | 0.34 |
| 7 | 1 | 128 | 5.32 | 20 | 26.02 | 25.93 | 0.09 |
| 7 | 2 | 128 | 6/32 | 24 | 27.60 | 27.44 | 0.16 |
| 7 | 3 | 128 | 7/32 | 28 | 28.94 | 28.95 | 0.01 |

The combined shifting and add operations provide a gain control range of 4/32 (−18.06 dB) to 28 (+28.94 dB) for a total 47 dB range. The actual gain curve versus gain control word is within +0.21/−0.34 dB of a least mean square error straight line and has a resolution of 1.5068 dB per the least significant bit of the gain control word.

Having disclosed a preferred embodiment of the invention, it is recognized that those skilled in the art may select different shifts and multiplication factors or electrical circuits than those illustrated and described herein within the scope of the claims set forth below.

What is claimed is:

1. A digital gain control loop for controlling the gain of input data to have a predetermined output level range comprising:

a gain control filter responsive to the power level of the output signal of the gain control loop to generate a multibit gain control word;

a shifter circuit responsive to selected bits of said gain control word shifts the input data in accordance with said selected bits to generate shifted data, the shifting of said input data corresponding to a first multiplication of the input data; and a multiplier circuit responsive to the remaining bits of said gain control word multiply said shifted data by preselected multiplication factors to generate said output signal, the shifted data being multiplied by preselected factors controlled by said remaining bits.

2. The gain control loop of claim 1 wherein said shifter circuit comprises:

at least one overflow logic circuit generating an overflow signal in response to detecting predetermined overflow conditions; and at least one output multiplexer for outputting said shifted data in response to the absence of said overflow signal and for outputting full scale values in response to said overflow signal.

3. The gain control loop of claim 2 wherein said shifter circuit has at least two levels of data shifters, said shifter circuit further has an overflow logic circuit associated with each of said at least two levels of data shifters and wherein each level of data shifters and said associated overflow logic circuit is response to a respective one of said selected bits of said gain control word.

4. The gain control loop of claim 3 wherein said at least two levels of data shifters comprises a first level data shifter, a second level data shifter and a third level data shifter, and wherein said preselected bits of said gain control word comprises the three most significant bits of said gain control word.

5. The gain control loop of claim 4 wherein said first level data shifter and its associated overflow logic circuit are responsive to a most significant bit of said gain control word, said second level data shifter and its associated overflow logic circuit are responsive to a second most significant bit of said gain control word and said third level data shifter and its associated overflow logic circuit are responsive to a third most significant bit of said gain control word.

6. The gain control loop of claim 5 wherein said first, second and third level data shifters comprise respectively a first, a second and a third multiplexer.

7. The gain control loop of claim 6 wherein:

said first multiplexer receives first shifted data at a first input and second shifted data at second input and outputs one of said first and second shifted data in response to the value of said most significant bit;

said second multiplexer receives the output of said first multiplexer at a first input and a shifted output of said first multiplexer at a second input and outputs one of said output or said shifted output applied to said second input in response to the value of said second most significant bit; and said third multiplexer receives the output of said second multiplexer at a first input and a shifted output of said second multiplexer at a second input and outputs one of said output applied to said first input or shifted output of said second multiplexer applied to said second input in response to the value of said third most significant bit of said gain control word.

8. The gain control loop of claim 7 wherein:

said first shifted data received at said first input to said first multiplexer is said input data shifted two bits to the left and said second shifted data received at said second input is said input data shifted four bits to the left and wherein said first shifted data is selected in response to said most significant bit being low and said second shifted data is selected in response to said most significant bit being high, said shifted output of said first multiplexer is received at said first input to said second multiplexer and at said second input to said second multiplexer is said output of said first multiplexer shifted two bits to the left and wherein said second multiplexer outputs the data received at said first input in response to said second most significant bit being low and outputs the data received at said second input in response to said second most significant bit being high; and said shifted output of said second multiplexer is received at said first input to said third multiplexer and to said second input to said third multiplexer shifted one bit to the left and wherein said third multiplexer outputs the data received at said first input in response to said third most significant bit being low and outputs the data received at its second input in response to said third significant bit being high.

9. The gain control loop of claim 5 wherein said overflow logic circuit associated with said first data level shifter comprises first logic means responsive to said most significant bit of said gain control word being high, the value of said five most significant bits of the input data signal not being the same to generate said overflow signal.

10. The gain control loop of claim 9 wherein said first logic means comprises:
an OR receiving said five most significant bits of said input data;
a NAND gate receiving said five most significant bits of said input data; and
an AND gate responsive to the output of said OR gate, said NAND gate and said most significant bit of said gain control word to generate said overflow signal when the outputs of said OR gate, said NAND gate and the value of said most significant bit are all high.

11. The gain control loop of claim 10 wherein sad overflow logic circuit associated with said second multiplexer comprises second logic means responsive to said second most significant bit of said gain control word being high and the value of said three most significant bits of the data output from the first multiplexer not being the same.

12. The gain control closed loop of claim 11 further including means responsive to the first significant bit of the data word received from the shifter circuit for generating a sign signal corresponding to the sign of the received data word.

13. The gain control loop of claim 12 wherein said second logic means comprises:
an OR gate receiving the three most significant bits of the data output from said first multiplexer;
a NAND gate receiving the three most significant bits of the data output from said first multiplexer;
an AND gate responsive to the outputs from said OR gate and said NAND gate and the value of said second most significant bit of said gain control word being high to generate said overflow signal; and
means responsive to said overflow logic circuit associated with said first multiplexer generating an overflow signal to generate an overflow signal independent of the value of the output of said AND gate.

14. The gain control loop of claim 13 further including means for generating a sign signal having a value indication of sign of the data word output from the first multiplexer.

15. The gain control loop of claim 14 wherein said overflow logic circuit associated with said third multiplexer comprises third logic means responsive to said third most significant bit of said gain control word and the two most significant bits of said data output from the second multiplexer to generate an overflow signal in response to the value of said two most significant bits of said data being different and said third most significant bit of said gain control word being high.

16. The gain control loop of claim 15 wherein said third logic means comprises:
an exclusive OR gate responsive to said two most significant bits of said data output from said second multiplexer;
an AND gate responsive to the output of said exclusive OR gate and said third most significant bit of said gain control word being high to generate said overflow signal; and a multiplexer responsive to said overflow logic associated with said second multiplexer generating an overflow signal to generate an overflow signal independent of the value of the output of said AND gate.

17. The gain control loop of claim 16 wherein said third logic means further comprises a multiplexer responsive to said overload logic circuit associated with said second multiplexer generating an overflow signal to output said sign signal generated by said second logic means in response to said overload signal.

18. The gain control loop of claim 1 wherein said multiplier circuit comprises:
first means for outputting a first data signal which is a first function of said shifted output data received from said shifter circuit in response to a first of said other bits of said gain control word having a first value and for outputting a second data signal which is a second function of the shifted output data received from shifter circuit in response to said first bit of said other bits of said gain control word having as second value; and
second means for outputting second output data which is a first function of the data signal output by the first means in response to a second bit of said other bits being a first value and for outputting fourth output data which is a second function of the output data output by said first means in response to said other gain control having a second value.

19. The gain control loop of claim 18 wherein said gain control word has five bits and wherein said first bit of said other bits is the penultimate bit of said gain control word and said second bit of said other bits is the least significant bit of said gain control word.

20. The gain control loop of claim 19 wherein said first means is a first loadable adder and said second means comprises:
a register; and
a second loadable adder.

21. The gain control loop of claim 20 wherein said shifted output data output from said shifter circuit is applied to a second input and a third input of said first loadable adder shifted two places to the left and applied to a first input of said first loadable adder shifted one bit to the left and said penultimate bit of said gain control word is applied to a load not input of said first loadable adder; and wherein
said output of said first loadable adder is applied to a second and a third input to said second loadable adder, said register stores the shifted output data output from the shifter circuit and said shifted output data stored in said register is applied to a first input of said second loadable adder and said least significant bit of said gain control bit is applied to a load not input, said output of said second loadable adder being said output signal.

22. A method for automatic digital gain control of received digital data comprising the steps of:
detecting to value of an output signal to generate a multibit gain control word;
shifting received input data in response to the value of selected most significant bits of the gain control word to generated shifted data having an increased value; and
multiplying said shifted data by selected multiplication factors in response to the remaining bits of said multibit gain control word to generate said output signal.

23. The method of claim 22 wherein said generated multibit word is a five bit word.

24. The method of claim 23 step of shifting comprises the steps of:

applying said input data to a first input to a first multiplexer shifted a first selected number of bits and applying said input data to a second input to said first multiplexer shifted a second selected number of bits;

outputting said shifted input data applied to said first input in response to the most significant bit of said gain control word being high and outputting said shifted data applied to said second input in response to said most significant bit being low;

applying said shifted data output from said first multiplexer to a first input to a second multiplexer shifted a third selected number of bits and applying said shifted data output from said first multiplexer to a second input of said second multiplexer;

outputting said shifted data applied to said first input to said second multiplexer in response to a second most significant bit of said gain control word being high and outputting said shifted data applied to said second input to said second multiplexer in response to said second most significant bit being high;

applying said data output of said second multiplexer to a first input of a third multiplexer shifted by one bit and applying said data output of said second multiplexer to a second input to said third multiplexer; and outputting said output of said second multiplexer applied to said first input of said third multiplexer in response to a third most significant bit of said gain control word being high and outputting said shifted data applied to said first input of said third multiplexer in response to said third most significant bit of said gain control word being low.

25. The method of claim 24 further includes the step of detecting an overflow condition of the data applied to said first, second and third multiplexer to generate an overflow signal bit; and activating a fourth multiplexer to output said data output from said third multiplexer in response to an absence of said overflow signal and outputting full scale values in response to said overflow signal.

26. The method of claim 25 wherein said step multiplying comprises the steps of:

applying the data output from said fourth multiplexer to a first input to a loadable adder shifted one bit and applying the data output from said fourth multiplexer to a second and a third input of the loadable adder shifted a second predetermined number of bits;

outputting said data applied to said third input in response to said penultimate bit of said gain control word being low and outputting the sum of the shifted data applied to said first and second inputs in response to said penultimate bit being high;

applying the output of said first loadable adder to a second and a third input to a second loadable adder and applying the data output from said fourth multiplexer to a first input to said second loadable adder; and outputting the data applied to the third input to said second loadable adder in response to the least significant bit of said gain control word being low and outputting the sum of the data applied to said first and second inputs of said second loadable adder in response to said least significant bit being high.

* * * * *